(12) United States Patent
Ittner et al.

(10) Patent No.: US 12,558,998 B2
(45) Date of Patent: Feb. 24, 2026

(54) VEHICLE SEAT WITH A LOCKING LEVER

(71) Applicant: BROSE FAHRZEUGTEILE SE & CO. KOMMANDITGESELLSCHAFT, COBURG, Coburg (DE)

(72) Inventors: Jessica Ittner, Niederfüllbach (DE); Björn Blüthgen, Coburg (DE); Wolfgang Bernhauser, Neustadt (DE)

(73) Assignee: BROSE FAHRZEUGTEILE SE & CO. KOMMANDITGESELLSCHAFT, COBURG, Coburg (DE)

( * ) Notice: Subject to any disclaimer, the term of this patent is extended or adjusted under 35 U.S.C. 154(b) by 112 days.

(21) Appl. No.: 18/262,133

(22) PCT Filed: Feb. 19, 2021

(86) PCT No.: PCT/EP2021/054150
§ 371 (c)(1),
(2) Date: Jul. 19, 2023

(87) PCT Pub. No.: WO2022/174915
PCT Pub. Date: Aug. 25, 2022

(65) Prior Publication Data
US 2024/0092232 A1 Mar. 21, 2024

(51) Int. Cl.
*B60N 2/10* (2006.01)
*B60N 2/02* (2006.01)
(Continued)

(52) U.S. Cl.
CPC ............. *B60N 2/12* (2013.01); *B60N 2/3065* (2013.01); *B60N 2/309* (2013.01)

(58) Field of Classification Search
CPC .................................. B60N 2/12; B60N 2/123
(Continued)

(56) References Cited

U.S. PATENT DOCUMENTS

| | | | |
|---|---|---|---|
| 5,820,216 A | 10/1998 | Feuillet | |
| 6,149,237 A | 11/2000 | Morishita et al. | |

(Continued)

FOREIGN PATENT DOCUMENTS

| | | |
|---|---|---|
| CN | 104619550 A | 5/2015 |
| CN | 108349412 A | 7/2018 |

(Continued)

OTHER PUBLICATIONS

United States Patent and Trademark Office, Non Final Office Action Issued in U.S. Appl. No. 18/262,120, Jun. 3, 2025, 13 pages.
(Continued)

*Primary Examiner* — Shin H Kim
(74) *Attorney, Agent, or Firm* — McCoy Russell LLP

(57) ABSTRACT
It is provided a vehicle seat which comprises a seat part having a seat part element, a basis and a lever, rotatably connected with the seat part element and by means of which the seat part element is supported on the basis movably relative to the basis. It is provided that the lever has a section adapted to make contact with at least one component of the seat part by rotation of the lever with respect to the seat part element.

13 Claims, 5 Drawing Sheets

(51) Int. Cl.
*B60N 2/04* (2006.01)
*B60N 2/12* (2006.01)
*B60N 2/30* (2006.01)

(58) Field of Classification Search
USPC ........................................................ 297/341
See application file for complete search history.

(56) References Cited

U.S. PATENT DOCUMENTS

| | | | |
|---|---|---|---|
| 10,239,427 B2 | 3/2019 | Keyser et al. | |
| 10,549,670 B1 | 2/2020 | Smith | |
| 10,647,236 B2 * | 5/2020 | Kish | B60N 2/943 |
| 10,974,621 B2 * | 4/2021 | Jung | B60N 2/12 |
| 11,453,313 B2 | 9/2022 | Chen et al. | |
| 2007/0278814 A1 | 12/2007 | Kojima | |
| 2008/0309136 A1 | 12/2008 | Kojima et al. | |
| 2014/0353454 A1 | 12/2014 | Yamada et al. | |
| 2015/0321583 A1 | 11/2015 | Sasaki et al. | |
| 2018/0194251 A1 | 7/2018 | Kreuels et al. | |
| 2019/0126785 A1 | 5/2019 | Sasaki et al. | |
| 2019/0143851 A1 | 5/2019 | Handigol et al. | |
| 2019/0152352 A1 * | 5/2019 | Handigol | B60N 2/12 |
| 2019/0225129 A1 | 7/2019 | Kish et al. | |
| 2019/0351792 A1 | 11/2019 | Kaemmerer | |
| 2019/0366880 A1 | 12/2019 | Dill et al. | |
| 2020/0247279 A1 | 8/2020 | Hattori et al. | |
| 2020/0391621 A1 | 12/2020 | Jung et al. | |

FOREIGN PATENT DOCUMENTS

| | | | |
|---|---|---|---|
| CN | 207916632 U | 9/2018 |
| CN | 109689425 A | 4/2019 |
| CN | 109996699 A | 7/2019 |
| DE | 1405227 A1 | 12/1968 |
| DE | 3608827 A1 | 10/1987 |
| DE | 10020923 A1 | 12/2001 |
| DE | 102010040424 A1 | 5/2011 |
| DE | 102016225843 A1 | 2/2018 |
| DE | 102004057106 B4 | 3/2018 |
| DE | 102019101551 A1 | 7/2019 |
| EP | 0029997 A1 | 6/1981 |
| EP | 2363316 A1 | 9/2011 |
| EP | 2028039 B1 | 10/2015 |
| FR | 1182137 A | 6/1959 |
| FR | 2376008 A1 | 7/1978 |
| FR | 2580914 A1 | 10/1986 |
| FR | 2882005 A1 | 8/2006 |
| FR | 2917679 A1 | 12/2008 |
| GB | 1540359 A | 2/1979 |
| JP | 2008247179 A | 10/2008 |
| WO | 2014048681 A1 | 4/2014 |
| WO | 2014077390 A1 | 5/2014 |
| WO | 2017173316 A1 | 10/2017 |
| WO | 2019096774 A2 | 5/2019 |
| WO | 2019201973 A1 | 10/2019 |
| WO | 2021214127 A1 | 10/2021 |

OTHER PUBLICATIONS

Korean Intellectual Property Office, Office Action Issued in Application No. 10-2023-7029369, Mar. 14, 2025, 10 pages. (Submitted with English Summary).

Korean Intellectual Property Office, Notice of Allowance Issued in Application No. 10-2023-7029369, Oct. 15, 2025, 5 pages. (Submitted with Partial Translation).

China National Intellectual Property Administration, Office Action and Search Report Issued in Application No. 202180093462.0, Dec. 22, 2025, 13 pages. (Submitted with Partial Translation).

China National Intellectual Property Administration, Office Action and Search Report Issued in Application No. 202180093482.8, Dec. 26, 2025, 14 pages. (Submitted with Partial Translation).

* cited by examiner

VEHICLE SEAT WITH A LOCKING LEVER

CROSS REFERENCE TO RELATED APPLICATION

The present application is a U.S. National Phase of International Application No. PCT/EP2021/054150 entitled "VEHICLE SEAT WITH A LOCKING LEVER," and filed on Feb. 19, 2021. The entire contents of the above-listed applications are hereby incorporated by reference for all purposes.

BACKGROUND

The proposed solution relates to a vehicle seat.

Such a vehicle seat comprises a seat part having a seat part element, a basis and a lever rotatably connected with the seat part element and by means of which the seat part element is supported on the basis movably relative to the basis.

A vehicle seat of this kind is described in DE 10 2019 101 551 A1. Therein a lock is mounted on a lever to lock the vehicle seat in a seatable use position. The lock can be released to move the vehicle seat to assume an easy-entry position as a functional position. In the easy-entry position, the seat part and a backrest are moved forward to facilitate an entry of passengers to a row of vehicle seats behind the vehicle seat.

Typically, vehicle seats as the known vehicle seat described above are prone to unintended misuse. For example, when a vehicle with the vehicle seat is parked on a steep street, the vehicle seat may tend to move back from the easy-entry position into the seatable use position with the danger for an occupant to become trapped. When the vehicle seat is adjustable and/or can be moved into more than one functional position, such as the easy-entry position and a fold-flat position, there can be a danger that while the seat is in one functional position, a user activates the other function. Depending on the construction of the vehicle seat this may, again, bear the danger to trap the user and/or damage parts of the vehicle seat. Usually, corresponding countermeasures require a complex construction.

While it is conceivable to provide end stop arrangements that restrict unintended movements, such arrangements often require numerous additional parts, again leading to a complex construction.

SUMMARY

It is an object underlying the proposed solution to provide an improved vehicle seat.

This object is solved by a vehicle seat with features as described herein.

Therein it is provided that the lever has a section that is adapted to make contact with at least one component of the seat part when the lever is rotated with respect to the seat part element.

This cooperation of the lever with the at least one component allows to provide an end stop for a movement of the vehicle seat without, or with only very few, additional parts. This allows to mitigate possible effects of a misuse of the vehicle seat using a simple construction. Particularly, this allows to provide an additional use for the lever in that the lever may serve as a locking means. In turn, the lever itself may control movement of components of the vehicle seat. This allows to avoid accidental misuse of vehicle seat, and particularly to avoid that the vehicle seat or components thereof unintendedly move. At least the seat part element is supported on the basis by means of the lever. When an occupant occupies the vehicle seat in the seatable use position, a weight force of the occupant is transmitted via the seat part into the lever, and from the lever into the basis.

The seat part may comprise a seat pan. The seat pan is adapted to support a user occupying the vehicle seat. For example, the seat pan comprises and/or supports a seat cushion. For example, the at least one component of the seat part is fixed to the seat pan and/or forms a part of the seat pan. This allows a specifically simple construction.

The seat pan may be movable with respect to the seat part element, e.g., for a height adjustment and/or to adjust the vehicle seat between a seatable use position and a fold-flat position further described below.

The at least one component may be or comprise one component, e.g., a bracket, that is fixed to the seat pan, e.g., to a cross-bar of the seat pan, and that is adapted to prevent a movement of the seat pan relative to the seat part element by cooperation with the section of the lever, e.g., when the vehicle seat is in an easy-entry position. This allows to prevent a misuse, e.g., an activation of a fold-flat function when the vehicle seat is in the easy-entry position.

Alternatively or in addition, the at least one component may be or comprise a component that may be fixed to or be a part of the seat pan, e.g., a cross-bar of the seat pan, and that is adapted to prevent a movement of the seat part with respect to the basis by cooperation with the section of the lever, e.g., when the vehicle seat is in the fold-flat position. This allows to prevent a misuse, e.g., an activation of the easy-entry function when the vehicle seat is in the fold-flat position.

Optionally, the section of the lever has a first surface adapted to make contact with one component of the seat part (e.g., the bracket), and a second surface adapted to make contact with another component (e.g., the cross-bar) of the seat part. This allows a dual use of the section and, therefore, a further reduction of the complexity of the vehicle seat.

Optionally, the first surface and the second surface are disposed on different faces of the section of the lever, e.g., on an end face and on a side face. This allows a simple and robust construction.

The lever may be rotatably connected to the basis at a first pivot axis and rotatably connected to the seat part element at a second pivot axis, wherein the section faces away from the first pivot axis. The first pivot axis is spaced apart from the second pivot axis. The section may extend at an angle with respect to a straight line connecting the first and second pivot axes.

The vehicle seat comprises a kinematics arrangement comprising the lever. The vehicle seat may be configurable, by means of the kinematics arrangement, in at least one seatable use position and in at least one functional position. This allows a particularly flexible use of the vehicle seat. Optionally, the kinematics arrangement comprises a four-bar linkage. The four-bar linkage may comprise the basis, the lever, another lever, and the seat part. Four-bar linkages allow very high stabilities and can precisely define kinematics of the seat part.

Optionally, the section of the lever is adapted to cooperate with the at least one component in the at least one functional position so that a movement of a component of the seat part is locked. This allows to avoid a misuse when assuming a functional position.

The section of the lever may be adapted to make contact with the at least one component of the seat part in the at least one functional position and be spaced apart therefrom in the at least one seatable use position. This allows to avoid a misuse in the functional position.

For example, the at least one functional position comprises the easy-entry position and/or the fold-flat position. The vehicle seat defines a design seating position with a front and a back in the view of an occupant occupying the vehicle seat in the design position. E.g., a backrest of the vehicle seat is arranged at the back or rear side of the vehicle seat, so that the occupant can lean back against it. Many vehicles comprise more than one row of vehicle seats, e.g., two or three rows. Some vehicles have two (or three) rows of vehicle seats, but only one (or two) doors per side. To facilitate entry of occupants to a row of vehicle seats behind the row with the vehicle seat described herein, the vehicle seat, or at least parts thereof, may be moved, and thus the vehicle seat configured, towards the front, i.e., forward, in the easy-entry position. Since the kinematics arrangement carries the seat part, the seat part is moved forward and a particularly comfortable entry to the next row can be provided. In other situations it is desirable to convert a vehicle seat to serve as a table, or to provide an enlarged storage space. Thus, in the fold-flat position, a backrest may be folded forward. The seat part may comprise the seat pan being movable with respect to the seat part element to move the vehicle seat between the seatable use position and the fold-flat position. Therefore, the kinematics arrangement may comprise a fold-flat lever that movably connects the seat part element with the seat pan. In order to allow a backrest to be folded, e.g., into a flat arrangement, the seat pan can be lowered by means of the kinematics arrangement, in particular to allow the backrest to be folded deeper.

The lever of the kinematics arrangement may be configured to be rotated relative to the seat part element when the vehicle seat is moved between the seatable use position and the easy-entry position. Thus, the lever may serve to support the seat part as well as to limit a movement of at least a part of the seat part.

For example, the at least one component of the seat part is a cross-bar, or is attached to a cross-bar of the seat part. This allows a particularly rigid solution without, or with only little additional material.

Optionally, the vehicle seat comprises a longitudinal adjustment device comprising at least an upper rail and a lower rail, that are longitudinally adjustable with respect to one another, wherein the basis is at least partially formed by and/or mounted on the upper rail. Alternatively, the lever of the kinematics arrangement is pivotably mounted on a vehicle floor. The longitudinal adjustment device allows a longitudinal adjustment of the vehicle seat in the seatable use position and/or a longitudinal displacement to assume an easy-entry position.

BRIEF DESCRIPTION OF THE DRAWINGS

The previously mentioned and other advantages of the present solution will be apparent to those skilled in the art upon consideration of the following specification and the attached drawings. Therein:

FIG. 5 shows a perspective view of the seat part of the vehicle seat in the easy-entry position.

FIG. 6 shows one of the levers of the kinematics arrangement of the vehicle seat in the easy-entry position.

DETAILED DESCRIPTION

Figure 1:
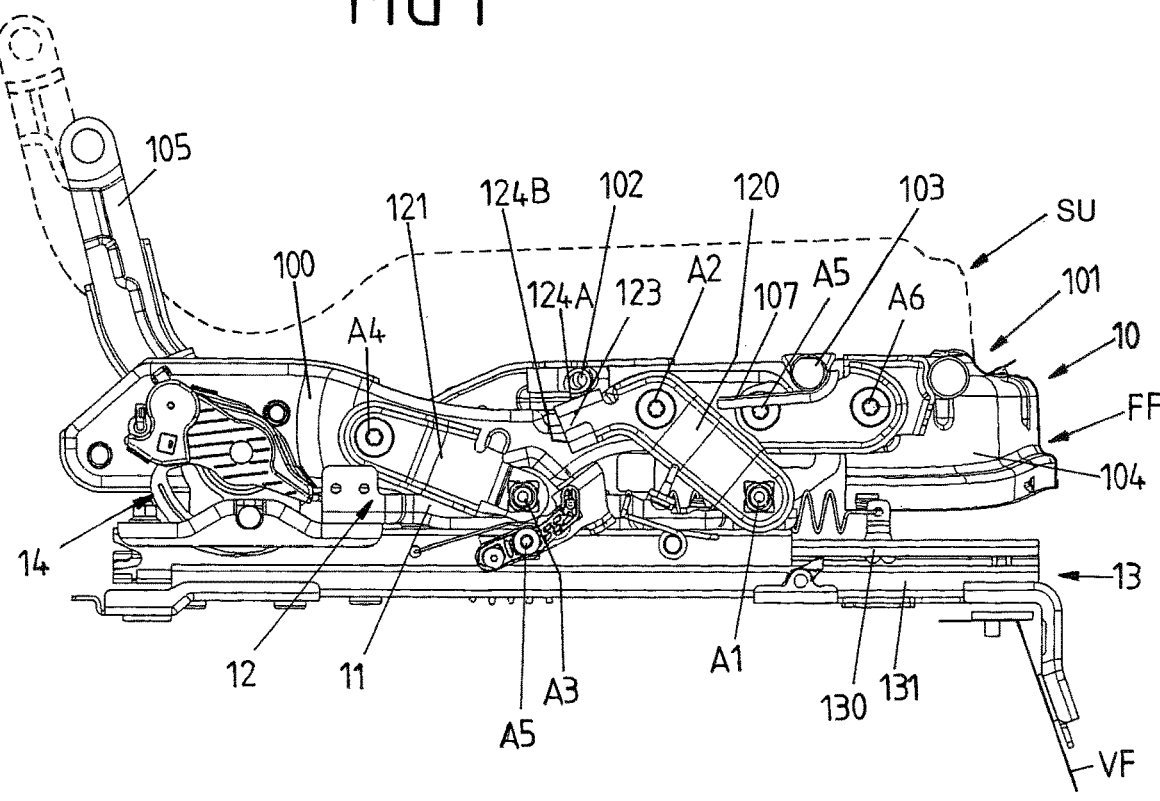
FIG. 1 shows a seat part of a vehicle seat in a fold-flat position.

FIG. 1 is a cross-sectional view of a vehicle seat 1, wherein an inner left side of the vehicle seat 1 is shown. The vehicle seat 1 also comprises a corresponding right side which may comprise, e.g., identical or mirror inverted parts compared to the left side.

Generally, the vehicle seat 1 comprises a seat part 10 whereon an occupant may take a seat, a basis 11 that supports the seat part 10, and a kinematics arrangement 12 that movably connects the seat part 10 to the basis 11. The vehicle seat 1 further comprises a longitudinal adjustment device 13 that allows a longitudinal displacement of the seat part 10 with respect to a vehicle floor VF. The vehicle seat 1 is mountable, and mounted, on the vehicle floor VF by means of the longitudinal adjustment device 13. In other embodiments the vehicle seat does not comprise a longitudinal adjustment device 13. In such embodiments, the basis 11 may be mountable, and mounted, on the vehicle floor VF, or the vehicle floor VF may serve as a basis.

Figure 7:
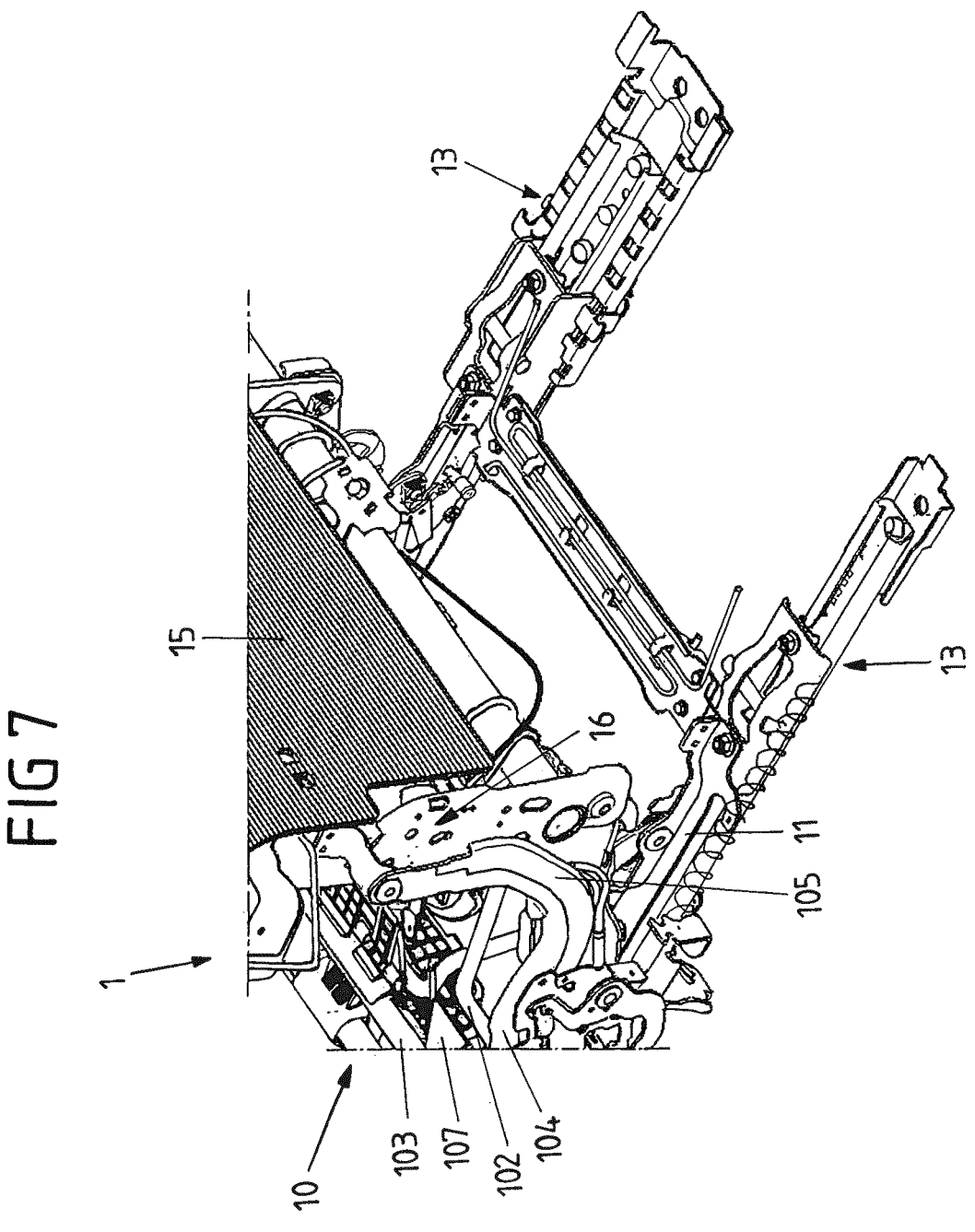
FIG. 7 shows a rear view of the vehicle seat in the easy-entry position.

The vehicle seat 1 further comprises a lock 14 that releasably locks the seat part 10 with the longitudinal adjustment device 13, and a backrest 15 which is not shown in FIG. 1 but visible in FIG. 7. A pair of recliners 16 (see FIG. 7) connects the seat part 10 with the backrest 15 and allows an adjustment of the inclination of the backrest 15 relative to the seat part 10. The backrest 15 is mounted on the seat part 10. Therefore, a movement of the seat part 10 relative to the vehicle floor VF also moves the backrest 15 with respect to the vehicle floor. VF.

The vehicle seat 1 can be adjusted to assume one of several positions. Particularly, the vehicle seat 1 can be configured in several seatable use positions. One seatable use position SU is shown with dashed lines in FIG. 1. In the seatable use positions SU, an occupant may take a seat in the vehicle seat 1, i.e., the seatable use positions SU are designed for seating. The different seatable use positions SU may differ among one another by the inclination of the backrest 15 relative to the seat part 10, by the longitudinal adjustment position of the longitudinal adjustment device 13 and the like.

Figure 2:
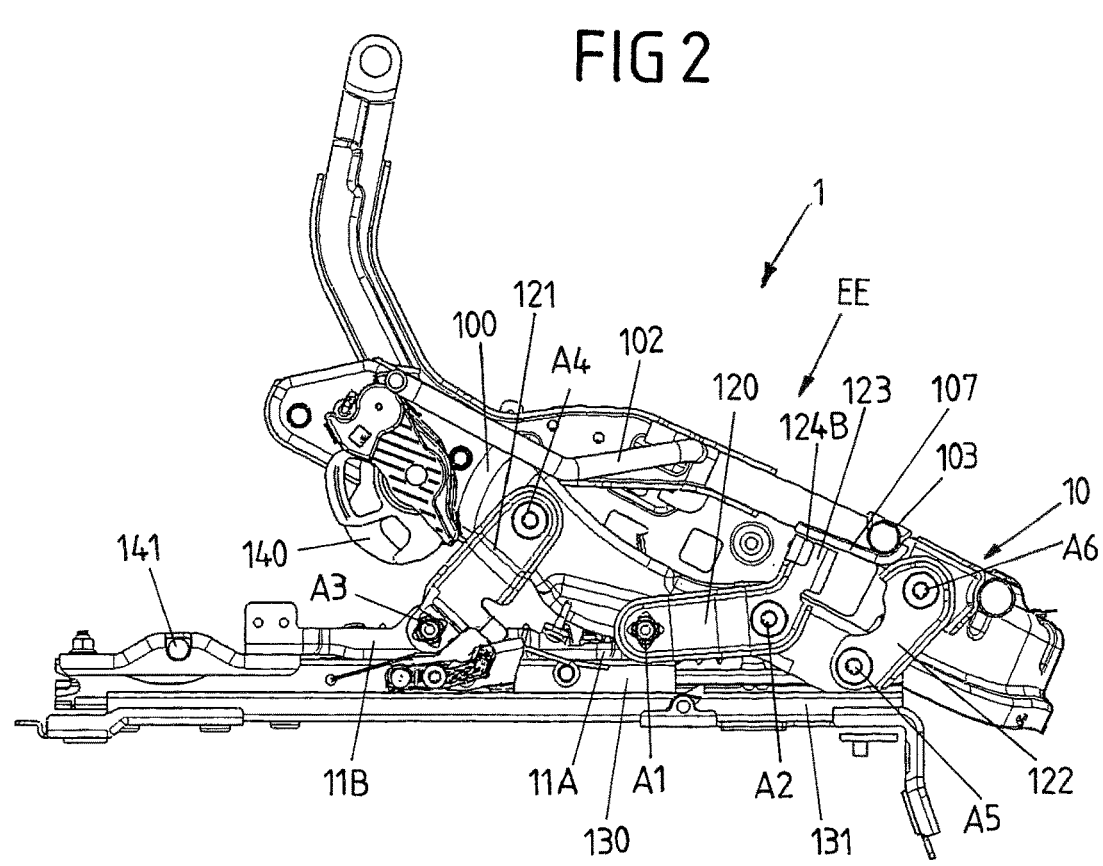
FIG. 2 shows the seat part of the vehicle seat in an easy-entry position.

Further, the vehicle seat 1 can be configured in one of two functional positions, namely in a fold-flat position FF, shown in FIG. 1 with solid lines, and in an easy-entry position EE, shown in FIG. 2. In other words, the vehicle seat 1 provides a fold-flat function and an easy-entry function.

In the following, first the fold-flat function will be described with reference mainly to FIG. 1, and thereafter the easy-entry function will be described with reference mainly to FIG. 2.

The seat part 10 of the vehicle seat 1 comprises two seat part elements 100 (one on each side, one of which being shown in FIG. 1) and a seat pan 101. The following description of the seat part element 100 visible in FIG. 1 correspondingly applies to the other seat part element of the vehicle seat 1, and the same holds for the components of the kinematics arrangement 12. The (each) seat part element 100 is supported on the basis 11 by means of two levers of the kinematics arrangement 12 which for ease of reference are referred to as a first easy-entry lever 120 and a second easy entry lever 121. The first easy-entry lever 120 is arranged in front of the second (rear) easy-entry lever 121. The first easy-entry lever 120 is pivotably mounted on the basis 11 by means of a pivot axis A1. The seat part element 100 is pivotably mounted on the first easy-entry lever 120 by means of a pivot axis A2. The second easy-entry lever 121 is pivotably mounted on the basis 11 by means of a pivot axis A3. The seat part element 100 is pivotably mounted on the second easy-entry lever 121 by means of a pivot axis A4.

Together, the basis 11, the easy-entry levers 120, 121 and the seat part element 100 form a four-bar linkage. Each of the easy-entry levers 120, 121 is formed in one piece.

The seat pan 101 comprises two side parts 104 (one of which being shown in FIG. 1) that are connected with one another by several cross-bars 102, 103. The seat pan 101 is adapted to support a seat cushion. The seat pan 101 is supported by the seat part elements 100. At a front portion, the seat pan 101 is movably connected with the seat part element 100 by means of a lever of the kinematics arrangement 12 that in the following is referred to as fold-flat lever 122. The fold-flat lever 122 is pivotably connected with the seat part element 100 by means of a pivot axis A5, and is pivotably connected with the seat pan 101 by means of another pivot axis A6. At a rear end, the seat pan 101 comprises an arm 105 (on each of the left and right sides). The arms 105 are pivotably connected to the backrest 15 spaced apart from (above) a reclining axis of the recliners 16 (see FIG. 7). Thus, folding the backrest 15 forward (backward) pivots the fold-flat lever 122 forward (backward). As a result, the seat pan 101 is moved forward and lowered into the fold-flat position FF shown in FIG. 1 when the backrest 15 is folded forward. This allows to fold the backrest 15 into a horizontal or almost horizontal arrangement, e.g., to serve as a table and/or to increase a cargo space.

In the seatable use position SU and in the fold-flat position FF, the lock 14 is locked.

The fold-flat function is activated in the seatable use position SU by folding the backrest 15 on the seat part 10, e.g., by releasing the recliners 16, and folding the backrest 15 manually, or by using an actuator device.

The longitudinal adjustment device 13 comprises an upper rail 130 and a lower rail 131. The upper rail 130 is longitudinally adjustably guided on the lower rail 131. The basis 11 is fixed to the upper rail 130 (alternatively, the upper rail 130 serves as the basis 11). The lower rail 131 is fixed to the vehicle floor VF.

FIG. 2 shows the vehicle seat in the easy-entry position EE. Therein, the lock 14 is released, i.e., a hook 140 mounted on the seat part element 100 is disengaged from a pin 141 mounted on the upper rail 130 of the longitudinal adjustment device 13. This allows a movement of the seat part 10 (and backrest 15) relative to the basis 11 by means of the kinematics arrangement 12. Starting from the seatable use position SU, after releasing the lock 14, the seat part 10 and backrest 15 can be moved forward, wherein the easy-entry levers 120, 121 pivot forward around their pivot axes A1, A3 on the basis 11. Thus, not only the backrest 15 is folded forward, but also the seat part is moved forward in order to allow a particularly easy entry into a row of seats behind the vehicle seat 1.

The easy-entry function is activated in the seatable use position SU by unlocking the lock 14.

However, in case that the easy-entry function is activated when the vehicle seat 1 is in the fold-flat position FF, or the fold-flat function is activated when the vehicle seat is in the easy-entry position EE, generally, an undefined movement of the seat part 10 and backrest 15 would be the result that could be difficult to handle for a user, or even potentially damage parts or bear a risk of trapping the user.

Therefore, the vehicle seat is provided with a protection mechanism that blocks a movement into the easy-entry position in the fold-flat position, and that blocks a movement into the fold-flat position in the easy-entry position. This mechanism has a particularly simple construction and comprises a section 123 of the first easy-entry lever 120, and the rear cross bar 102 and a bracket 107 mounted on another cross bar 103 mounted further to the front of the vehicle seat 1. The section 123 may be covered, e.g., by an additional damping element.

Specifically, the section 123 of the first easy-entry lever 120 is adapted and arranged to make contact and cooperate with at least one component (cross bar 102 and bracket 107) of the seat part 10 when the lever is rotated with respect to the seat part element 100 in at least one position of the first easy-entry lever 120, wherein the section 123 is adapted and arranged to cooperate with the at least one component (cross bar 102 and bracket 107) in the at least one functional position EE, FF and is spaced apart, disengaged from the at least one component (cross bar 102 and bracket 107) in the at least one seatable use position SU. In the seatable use position SU, the section 123 does not cooperate with the at least one component.

In the present example, the section 123 of the first easy-entry lever 120 is adapted to cooperate with the cross bar 102 in the fold-flat position FF, and to cooperate with the bracket 107 in the easy-entry position.

The section 123 of the first easy-entry lever 120 protrudes from the remainder of the lever. The first easy-entry lever 120 comprises a portion that extends along the straight line between the pivot axes A1, A2 of the first easy-entry lever 120, and the section 123 protrudes from that portion at an oblique angle with respect to this straight line. The section 123 extends from the pivot axis A2 at the seat part element 100 further away from the pivot axis A1 at the basis 11. The distance of the section 123 to the pivot axis A1 at the basis 11 is larger than the distance between the two pivot axes A1, A2.

Figure 3:
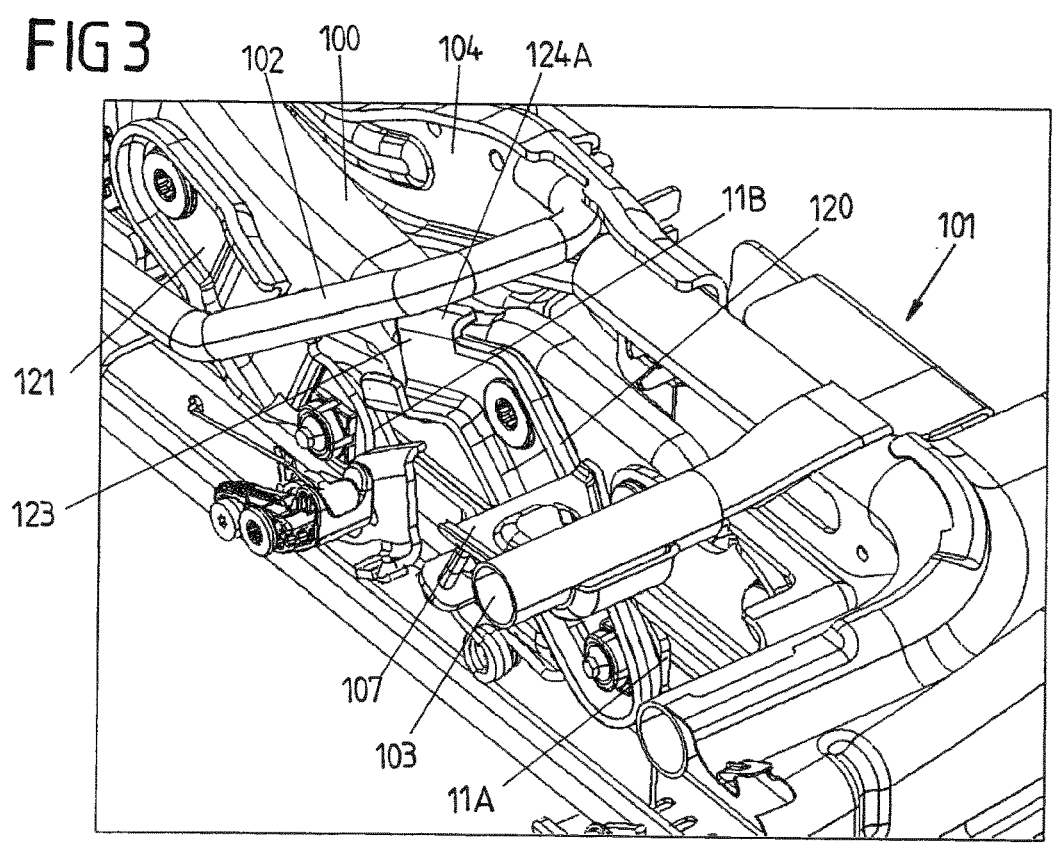
FIG. 3 shows levers of a kinematics arrangement of the vehicle seat in the fold-flat position, and components cooperating with the levers to control movement of parts of the vehicle seat.
Figure 4:
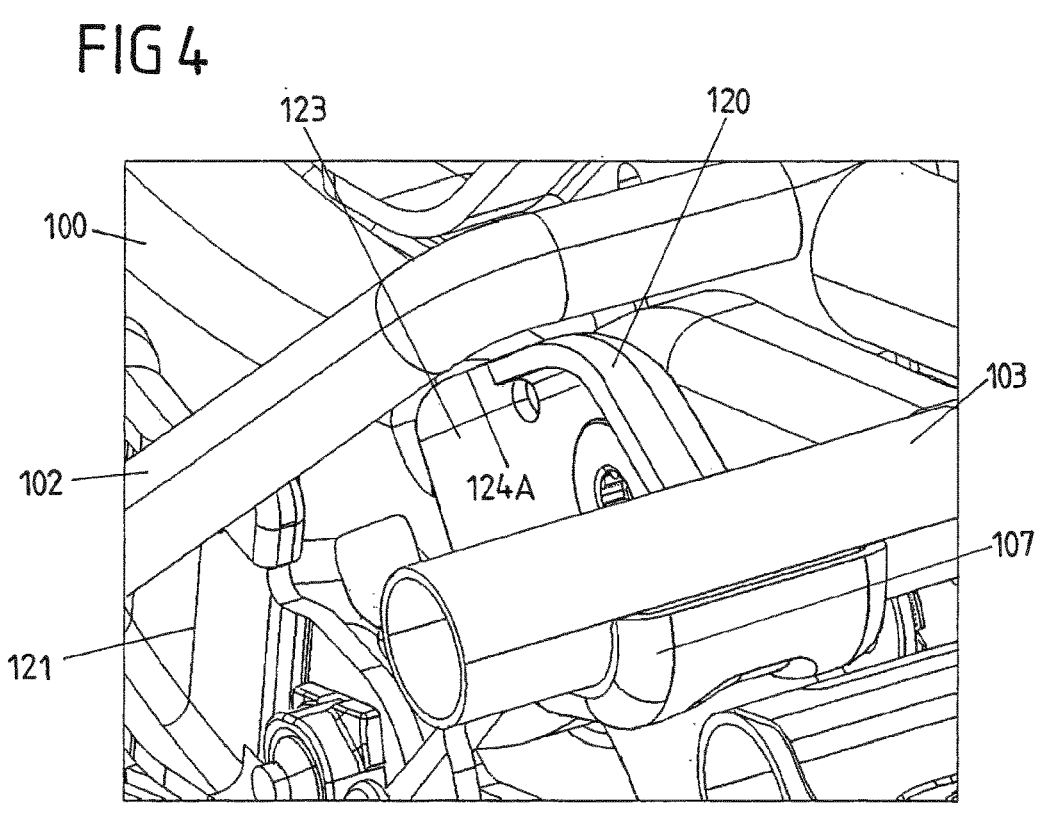
FIG. 4 shows a detail of a section of the lever in the fold-flat position and of the components adapted to cooperate therewith.

With particular reference to FIGS. 1, 3 and 4 the cooperation of the section 123 of the first easy-entry lever 120 with the cross bar 102 in the fold-flat position FF will now be described.

In the fold-flat position FF the section 123 of the first easy-entry lever 120 abuts against the (rear) cross bar 102. The section 123 of the first easy-entry lever 120 may be adapted to make contact with the cross bar 102, e.g., to provide a stop, or to leave a clearance in between as shown in FIG. 4. Optionally, the section 123 is provided with a damper.

As can be seen particularly in FIG. 3, the section 123 of the first easy-entry lever 120 has a first surface 124A that contacts or directly faces the cross bar 102 in the fold-flat position FF. For an increased stability the first surface 124A is formed by a bent portion of the material forming the first easy-entry lever 120.

When the user attempts to activate the easy-entry function in the fold-flat position FF, i.e., starting from the position shown in FIGS. 1, 3 and 4, the first easy-entry lever 120 would pivot in the forward direction, but such a movement is blocked by the section 123 (more precisely, the first surface 124A thereof) colliding with the cross bar 102.

Therefore, moving the vehicle seat 1 configured in the fold-flat position FF in the easy-entry position EE is prohibited in a particularly simple way.

Figure 5:
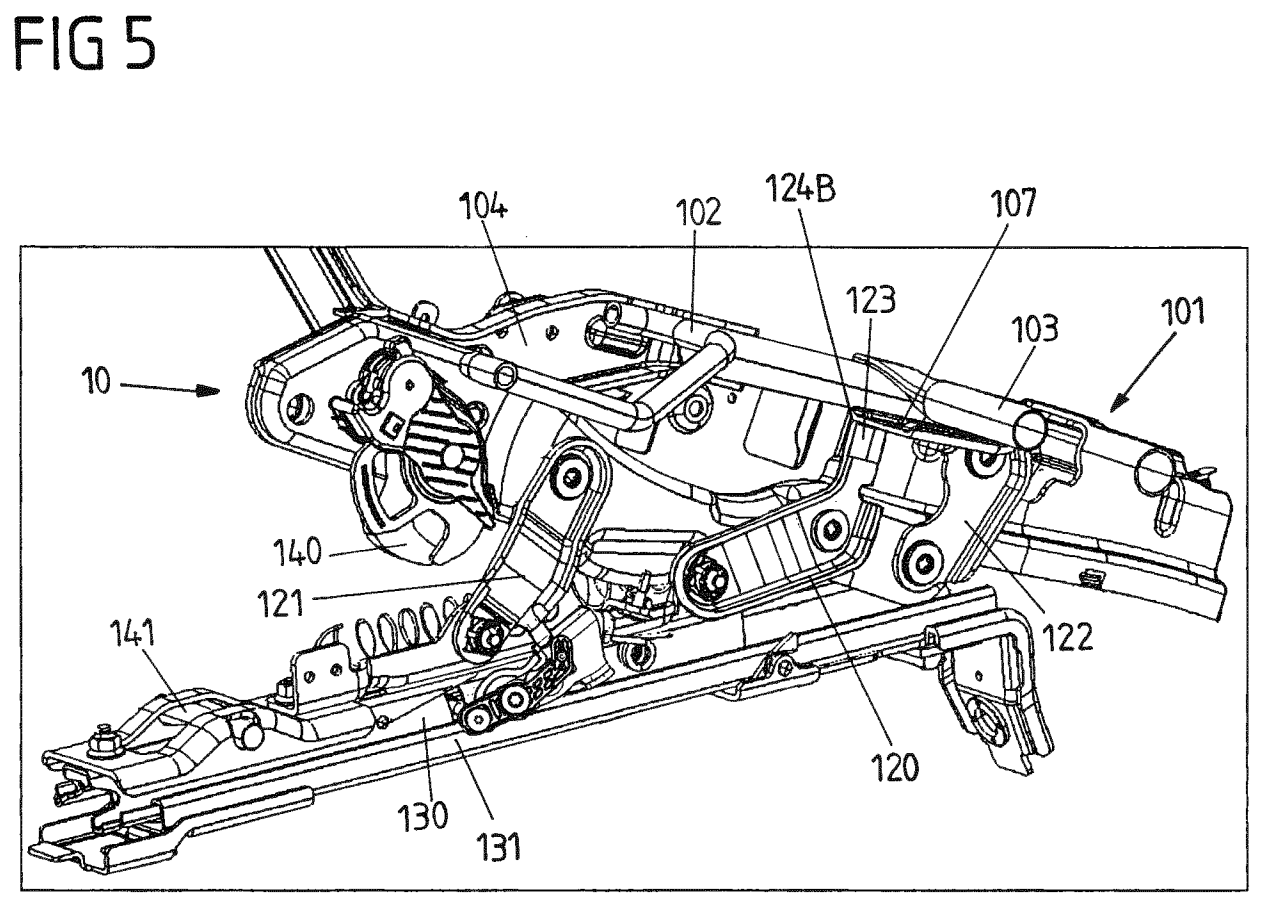
Figure 6:
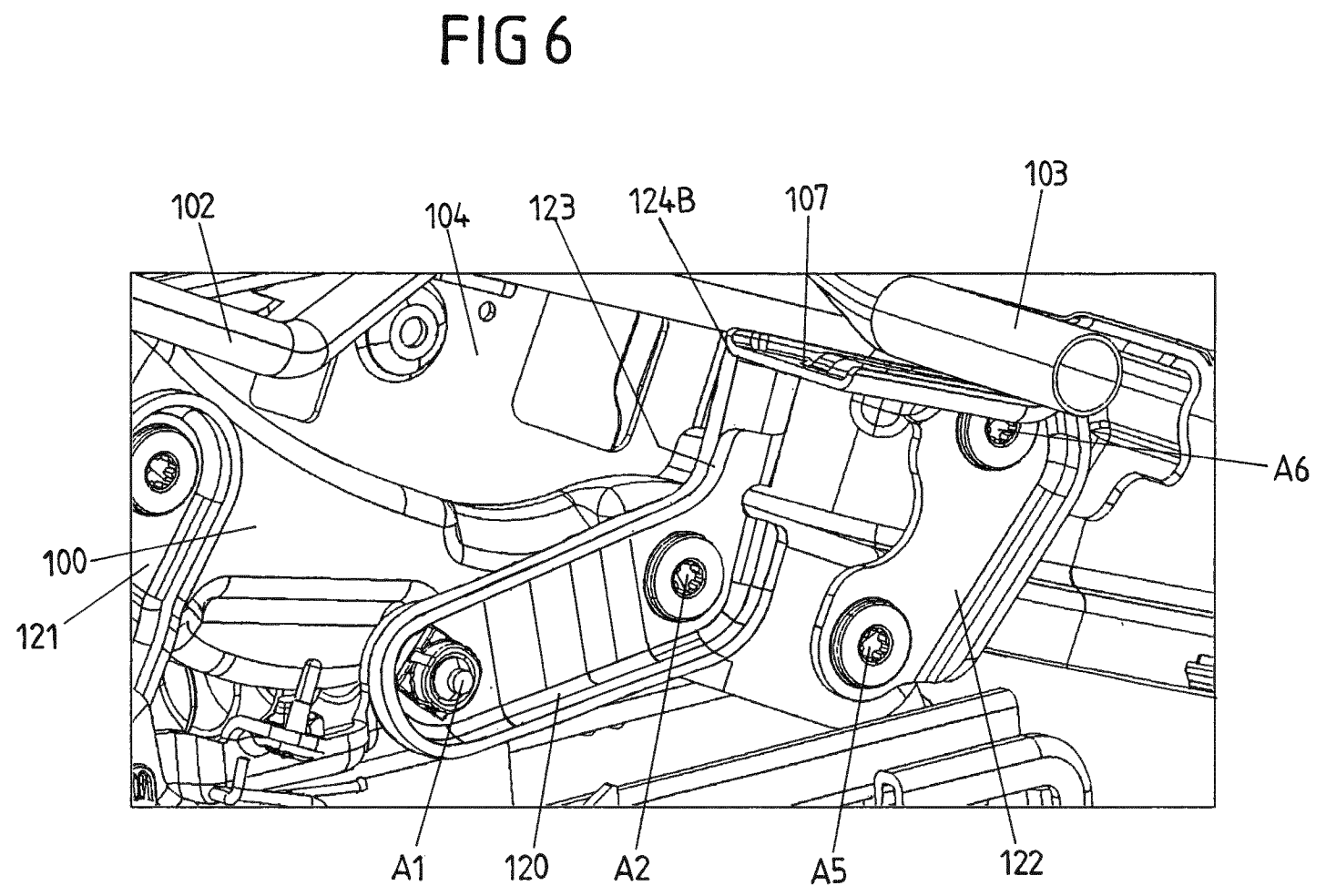

With particular reference to FIGS. 2, 5 and 6 the cooperation of the section 123 of the first easy-entry lever 120 with the bracket 107 in the easy-entry position EE will now be described.

In the easy-entry position EE the section 123 of the first easy-entry lever 120 abuts against the bracket 107 mounted on the cross bar 103 (which is spaced apart from the cross bar 102 cooperating with the section 123 in the fold-flat position FF). The section 123 of the first easy-entry lever 120 may be adapted to make contact with the bracket 107, e.g., to provide a stop, or to leave a clearance in between as shown in FIG. 6. As mentioned, optionally, the section 123 is provided with a damper.

As can be seen particularly in FIG. 6, the section 123 of the first easy-entry lever 120 has a second surface 124B that contacts or directly faces the bracket 107 in the easy-entry position EE. For an increased stability the second surface 124B is formed by a bent portion of the material forming the first easy-entry lever 120. With the bent portions the section 123 may have an S-shaped cross section.

The first surface 124A extends in a first flat plane and the second surface 124B extends in a second flat plane. The first and second flat planes extend orthogonally with respect to one another (in other embodiments at another angle, in general at an angle with respect to one another).

When the user attempts to activate the fold-flat function in the easy-entry position EE, i.e., starting from the position shown in FIGS. 2, 5 and 6, the first easy-entry lever 120 would pivot in the backward direction, but such a movement is blocked by the section 123 (more precisely, the second surface 124B thereof) colliding with the bracket 107.

Hence, moving the vehicle seat 1 configured in the easy-entry position EE in the fold-flat position FF is prohibited in a particularly simple way. More specifically, two surfaces of the same section 123 of the first easy-entry lever 120 blocks the activation of the easy-entry function or fold-flat function when the vehicle seat 1 is configured in the respective other position. By the section 123 of the first easy-entry lever 120 and the components cooperating therewith a simple but effective mechanical block against a double actuation of the easy-entry and fold-flat functions is provided.

LIST OF REFERENCE NUMERALS 1 vehicle seat
10 seat part
100 seat part element
101 seat pan
102 cross bar (component)
103 cross bar
104 side part
105 arm
106 attachment area
107 bracket (component)
11 basis
12 kinematics arrangement
120 (first) easy-entry lever
121 (second) easy-entry lever
122 fold-flat lever
123 section
124A first surface 124B second surface
13 longitudinal adjustment device
130 upper rail
131 lower rail
14 lock
140 hook
141 pin
15 backrest
16 recliner
A1-A8 pivot axis
VF vehicle floor
EE easy-entry position
FF fold-flat position
SU seatable use position

The invention claimed is:

1. A vehicle seat, comprising:
a seat part having a seat part element,
a basis, and
a lever, rotatably connected with the seat part element, and by means of which the seat part element is supported on the basis movably relative to the basis,
wherein the lever has a section adapted to make contact with at least one component of the seat part by rotation of the lever with respect to the seat part element, and
wherein the section of the lever has a first surface adapted to make contact with one component of the seat part, and a second surface adapted to make contact with another component of the seat part.

2. The vehicle seat according to claim 1, wherein the seat part comprises a seat pan, wherein the at least one component of the seat part is fixed to the seat pan.

3. The vehicle seat according to claim 2, wherein the seat pan is movable with respect to the seat part element.

4. The vehicle seat according to claim 3, wherein the at least one component comprises a component that is fixed to the seat pan and adapted to prevent a movement of the seat pan with respect to the seat part element by cooperation with the section of the lever.

5. The vehicle seat according to claim 1, wherein the at least one component comprises a component adapted to prevent a movement of the seat part with respect to the basis by cooperation with the section of the lever.

6. The vehicle seat according to claim 1, wherein the first surface and the second surface are disposed on different faces of the section of the lever.

7. The vehicle seat according to claim 1, wherein the lever is rotatably connected with the basis at a first pivot axis and rotatably connected with the seat part element at a second pivot axis, wherein the section faces away from the first pivot axis.

8. The vehicle seat according to claim 1, further comprising a kinematics arrangement comprising the lever, wherein the vehicle seat is configurable, by means of the kinematics arrangement, in at least one seatable use position and in at least one functional position.

9. The vehicle seat according to claim 8, wherein the section of the lever is adapted to cooperate with the at least one component in the at least one functional position so that a movement of a component of the seat part is locked.

10. The vehicle seat according to claim 8, wherein the section of the lever is adapted to make contact with the at least one component of the seat part in the at least one functional position and is spaced apart therefrom in the at least one seatable use position.

11. The vehicle seat according to claim 8, wherein the at least one functional position comprises at least one of an easy-entry position and a fold-flat position.

12. The vehicle seat according to claim 11, wherein the lever of the kinematics arrangement is configured to be rotated relative to the seat part element when the vehicle seat is moved between the seatable use position and the easy-entry position.

13. The vehicle seat according to claim 1, wherein the at least one component of the seat part is a cross-bar, or is attached to a cross-bar.

* * * * *